Jan. 5, 1937. P. E. BACKMANN 2,066,446
PRECISION INSTRUMENT
Filed Oct. 7, 1935
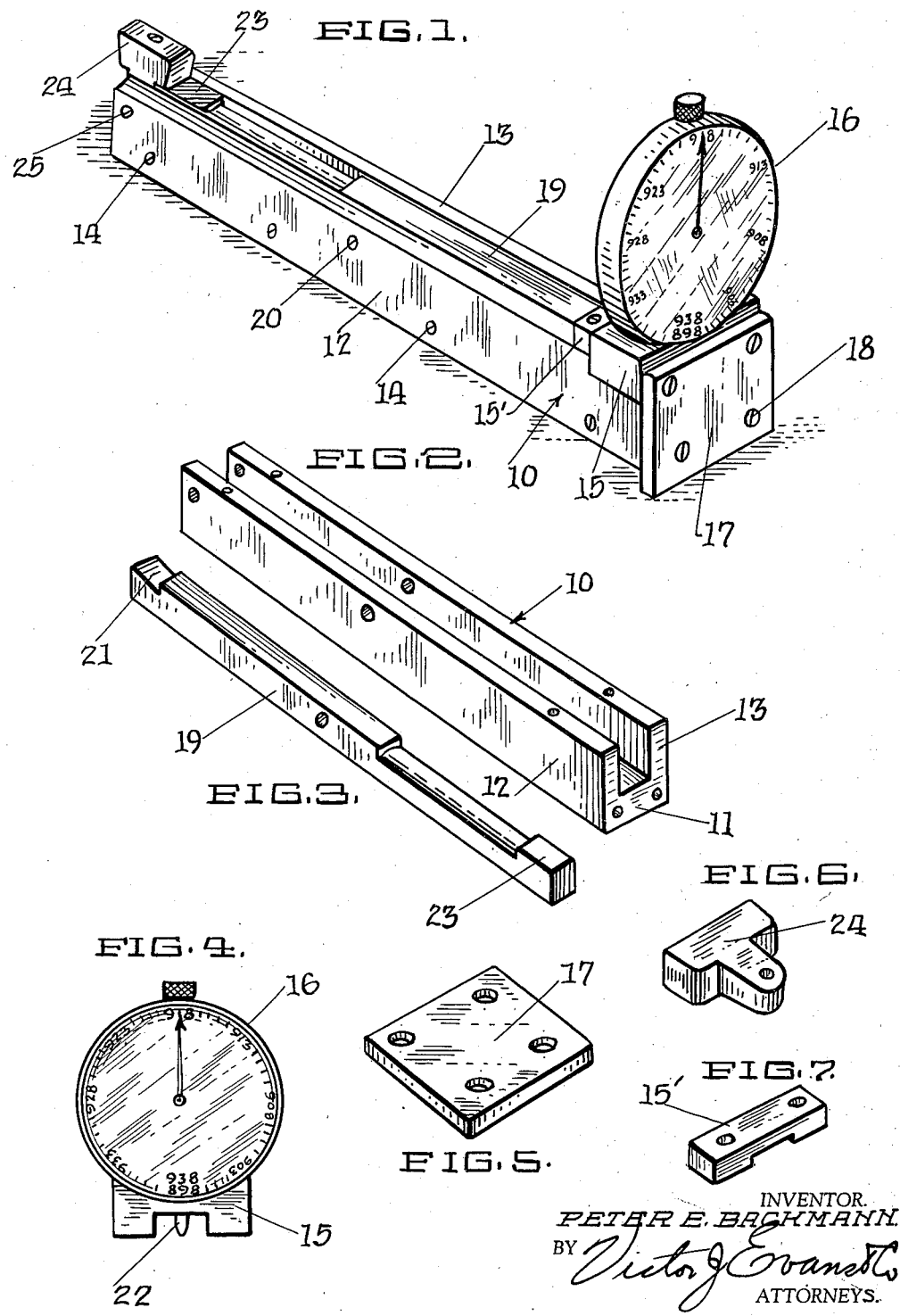
INVENTOR.
PETER E. BACKMANN.
BY Victor J. Evans
ATTORNEYS.

Patented Jan. 5, 1937

2,066,446

UNITED STATES PATENT OFFICE 2,066,446

PRECISION INSTRUMENT

Peter Ernest Backmann, Los Angeles, Calif.

Application October 7, 1935, Serial No. 43,981

1 Claim. (Cl. 33—148)

This invention relates broadly to improvements in precision instruments and has particular reference to a precision device or instrument for printers' and engravers' use in accurately setting and adjusting the rollers on cylinder presses.

The principal object of the invention is to provide an instrument of the class set forth that is handy and accurate and that will save the printer or engraver considerable time in setting the rollers of roller printing presses.

Another object of the invention is to provide a gauging instrument that combines therewith a micrometer adapted to accurately gauge the setting of the instrument to an exact half-thousandth of an inch.

A further object of the invention is to provide an instrument of this type that is extremely simple in construction, is positive in operation, and that employs but few working parts in its assembly.

A still further object of the invention is to provide an instrument of the class set forth that embodies an attachment capable of accurately setting the knives on trimmer heads; and also for setting the knives on type-high machines to exactly .918 high in photo-engraving work.

Other objects and advantages will be apparent during the course of the following description.

In the accompanying drawing forming a part of this specification and in which like numerals are employed to designate like parts throughout the same, Fig. 1 is a perspective view illustrating my improved instrument and including the micrometer and trimmer head setting device.

Fig. 2 is a perspective view of the base of the device.

Fig. 3 is a perspective of the rocker arm of the device.

Fig. 4 is a face view of the micrometer or gauge for reading the adjustments.

Fig. 5 is a perspective view of the front plate of the device for holding the gauge in position.

Fig. 6 is a perspective view of the attachment for setting the knives of trimmer heads; and Fig. 7 is a perspective view of the clamping block for mounting the gauge of the device in place upon base.

It is the customary practice in the printer's and engraver's art to set the press rollers by the inaccurate method of utilizing the pressman's sense of touch. This method while accurate to some extent is slow and costly and it is, therefore, the object of my invention to provide an instrument for the purpose which enables the operator to ascertain by means of the micrometer gauge to a half-thousandth of an inch the setting of his roller, or to set the same evenly to .918 (type-high) with mechanically accurate precision.

This accurate mechanical setting of the press rollers improves the distribution of the ink on the printing form, and the pressman may also use the device to detect any warping which may occur in the press rollers.

My improved gauging device comprises in detail, a base or support 10, shaped in the form of a U and embodying a base member 11 having upstanding sides 12 and 13, the whole being held securely together by means of screws 14.

Mounted at one end of the support is a block 15 to which the micrometer 16 is fixedly clamped, said block being securely held in place by means of a block 15' and a front plate 17 secured to the support by means of screws 18.

The rocker bar 19 is pivoted in the support at the point 20 and extends throughout the slotted base, one end 21 of which extends under the slotted block 15 and is adapted to engage the micrometer actuating pin 22 of the micrometer 16, Fig. 4.

The opposite free end 23 of the rocker bar is adapted to contact the setting block 24 pivoted at the point 25 when it is desired to utilize this attachment for setting the knives of a trimmer head.

It will thus be observed that by placing the device lengthwise under a roller to be set and by adjusting the roller up or down in the usual manner the exact setting desired may be secured with mechanically accurate precision, which precision could not possibly be attained by the sense of touch method commonly employed in this work.

The block 24, while shown in position in Fig. 1 is only utilized when it is desired to set trimmer head knives and it is to be understood that the same is removed when the instrument is to be used as a gauge for press rollers.

It is to be understood that the form of my invention herewith shown and described is to be taken as a preferred example of the same and that various changes relative to the material, size, shape and arrangement of parts may be resorted to without departing from spirit of the invention or the scope of the subjoined claims.

Having thus described my invention, I claim:—

In the device of the class described, a substantially U-shaped member, comprising a base and up-standing side pieces, a front plate secured to one end of said U-shaped member, a block secured to said side pieces and spaced from said front plate, a micrometer bearing block positioned between said first mentioned block and said face plate, a rocker bar pivoted between said side pieces and having one end underlying said micrometer bearing block, and a pivoted member positioned between said side pieces and overlying the opposite end of said rocker member from that underlying said micrometer bearing block, whereby movement of said pivoting member actuates said rocker bar to effect a reading of the micrometer on said block.

PETER ERNEST BACKMANN.